(12) United States Patent
Koch et al.

(10) Patent No.: US 8,504,306 B2
(45) Date of Patent: Aug. 6, 2013

(54) GRAPHICAL TECHNIQUE FOR VISUALIZING EFFECTS OF ENVIRONMENTAL EMISSION REDUCTIONS

(75) Inventors: Robert Koch, San Francisco, CA (US); Udo Waibel, Los Altos, CA (US)

(73) Assignee: Hara Software, Inc., San Mateo, CA (US)

( * ) Notice: Subject to any disclaimer, the term of this patent is extended or adjusted under 35 U.S.C. 154(b) by 477 days.

(21) Appl. No.: 12/748,255

(22) Filed: Mar. 26, 2010

(65) Prior Publication Data
US 2011/0137574 A1 Jun. 9, 2011

Related U.S. Application Data

(60) Provisional application No. 61/228,262, filed on Jul. 24, 2009.

(51) Int. Cl.
*G01N 31/00* (2006.01)
(52) U.S. Cl.
USPC .............. 702/24; 702/179; 702/182; 702/187
(58) Field of Classification Search
USPC ................ 709/238; 705/35, 36 T, 37; 702/24, 702/179, 182, 187; 405/129.45; 342/90; 73/23.2, 23.35
See application file for complete search history.

(56) References Cited

U.S. PATENT DOCUMENTS

| | | | | |
|---|---|---|---|---|
| 6,952,945 | B2 * | 10/2005 | O'Brien | 73/23.35 |
| 7,959,376 | B1 * | 6/2011 | Duesel et al. | 405/129.95 |
| 8,010,413 | B2 * | 8/2011 | Natunen et al. | 705/26.1 |
| 2003/0083980 | A1 * | 5/2003 | Satake | 705/37 |

* cited by examiner

*Primary Examiner* — Sujoy Kundu
*Assistant Examiner* — Elias Desta
(74) *Attorney, Agent, or Firm* — Patent Law Group LLP; David C. Hsia

(57) ABSTRACT

An emission management system is implemented via a host server that is accessible to a large number of clients (organizations) using a website. Based on data input by a client relating to actual usage of resources, the client's past CO2e emission over time is calculated by the host server and displayed to the client on the website in the form of a wedge chart, with emissions along the y-axis and time along the x-axis. The server software also extrapolates the past emissions to display baseline predicted future emissions, assuming no reduction strategies are implemented. The client also inputs an emission target level and proposes one or more strategies for reducing the baseline level to achieve the target level. The server converts each strategy to a CO2e emission reduction and layers the different reductions between the baseline level and the target so the client can graphically see the effect of each strategy on achieving the target.

20 Claims, 3 Drawing Sheets

GRAPHICAL TECHNIQUE FOR VISUALIZING EFFECTS OF ENVIRONMENTAL EMISSION REDUCTIONS

CROSS-REFERENCE TO RELATED APPLICATIONS

This application claims the benefit of provisional application 61/228,262, filed on Jul. 24, 2009, entitled Method and Apparatus for Visualizing Environmental Emission Reductions, by Robert Koch and Udo Waibel.

FIELD OF THE INVENTION

The present invention generally relates to the field of emissions management. More specifically, the invention describes a method to visualize the current emission level in an organization across accounting periods, model proposed emission reductions and their reduction impact against this level and predicted future levels, and compare the result with internal targets or external (government imposed) regulations. A typical field of application is the measuring of greenhouse gases (GHG) emitted by an organization.

BACKGROUND

"Emissions" refer to the introduction of chemicals, particulate matter, or biological materials into the atmosphere, ground, or water system that potentially can cause harm or discomfort to humans or other living organisms, or may damage the natural environment.

GHG is a collective term for gases such as carbon dioxide, methane, HFCs, SF6, and nitrous oxide that trap heat in the atmosphere and contribute to climate change. GHG accounting and reporting is the discipline of tracking GHGs produced as a result of executing business processes, including manufacturing, travel, keeping of livestock, etc.

The term "carbon dioxide equivalent" ($CO_2e$) is the unit of measurement used to compare the relative climate impact of the different GHGs. The $CO_2e$ quantity of any GHG is the amount of carbon dioxide that would produce the equivalent global warming potential.

"Targets" are goals defined internal to an organization, such as a desired emissions goal or a desired resource consumption goal, within an established timeframe.

Legal caps ("caps") are emission level goals defined externally by a governmental or industrial organization within an established timeframe. Typically, the caps refer to only the direct emissions of an organization.

A desired feature of a complete emissions management system is to help the organization create strategies for reducing emissions, rather than just track emissions, and to provide the ability to track the predicted and actual impact of such measures over time, so that the organization can reach their target or cap.

It is a complex task to evaluate the effects of one or more strategies to lower an organization's emissions to meet their target or cap. For example, determining each strategy's relative contribution to achieving an emissions goal over multiple accounting periods is difficult to comprehend, especially when the strategies may be implemented at different times. Decision makers in organizations need to efficiently evaluate the contributions of the various proposed strategies and their costs to determine the optimal approach to achieve an emissions goal over a span of accounting periods.

What is needed is a technique to represent past, current, and future emissions (or related environmental information) in a simple graphical manner, where the effects of proposed strategies for reducing future emissions to achieve a goal are easily understood by the decision makers.

SUMMARY

In one embodiment, an emission management system is implemented via a host server that is accessible to a large number of clients (organizations) using a website. For each accounting period, an organization enters data that is used by programs run by the server to calculate $CO_2e$ emissions or other related environmental impact information. If the organization desires to know its past and current $CO_2e$ emissions, the client navigates through a menu driven website and is presented with a chart having a time line along the x-axis, such as spanning years segmented by accounting periods, and the quantity of $CO_2e$ emissions along the y-axis. The $CO_2e$ emission may be in tonnes.

$CO_2e$ emissions will be used in the example, although the inventive chart may convey other information. Although most emissions can be converted into a $CO_2e$ emission by applying accepted factors, virtually every resource usage by an organization can also be converted into a $CO_2e$ emission by applying suitable factors, since every resource can be associated with an amount of energy used to create the resource, consume the resource, and dispose of any resource waste. For example, airline travel by employees or the usage of paper can be converted to a $CO_2e$ emission.

The organization enters target levels, such as $CO_2e$ levels, for future emissions for a span of years. The target levels will typically be a line that may increase, decrease, or stay the same over time. Typically, the organization's targets for future emissions will be lower than extrapolated predicted future emissions (baseline emissions) determined by the programmed server, where the baseline emissions are predicted future emissions assuming no strategies are implemented to reduce emissions. For example, the server may calculate that the organization's future emissions will increase by 10% per year due to the anticipated growth of the organization.

The server creates a chart showing the past, current, and predicted baseline emissions for a span of years, along with the target line. The baseline emissions and target line will normally diverge to form a wedge-shaped gap. The organization must then devise ways to close the gap using one or more strategies. These strategies may include, for example, progressively reducing employee travel, replacing bulbs with LEDs, using more efficient windows, using green power sources, etc. Each strategy may be associated with a different implementation time.

The server then calculates the $CO_2e$ emission reduction over time for each strategy and shows the reduction in the chart, where each strategy is identified as a different layer (typically wedge-shaped) between the baseline emissions and the target line. Each strategy may be color-coded to distinguish the layers. If there is still a gap between the lowest strategy layer and the target line, the difference may be made up by buying carbon credits. If the strategies drop the emissions below the target line or below a cap, the surplus may be effectively sold to another organization. The software may assist in the transfer of carbon credits between organizations to meet government requirements.

The chart is referred to herein as a wedge chart.

By using the wedge chart as a graphical tool, the organization may go through many iterations, adjusting the strategies, to achieve the target levels. In one embodiment, the software proposes options regarding the creation of appropriate strategies.

In addition to charting CO2e emissions, the wedge chart may depict other relevant information calculated by the server, such as original source input (e.g., 10,000 kwh of electricity), normalized output (e.g., 5000 metric tons of CO2 or CO2e), or associated cost (e.g., 10,000 kwh of electricity @ $0.12 per kwh=$1200). After an organization determines their emissions, each of these dimensions can help to gain separate and more detailed insights into the ongoing organizational activities that result in environmental emissions. The organization will then be able to better implement an emission reduction strategy, such as by reducing consumption of a particular resource.

Virtually any activity that an organization undertakes to reduce their environmental emissions can be measured in the dimensions of input, output, or cost by the client just selecting the appropriate wedge chart from the website. Accordingly, the organization may set targets using input, output, or cost.

The different emission reduction strategies can have different levels of organizational commitment. As such, the chart may be configured to display the total level of reductions currently planned/proposed vs. the total level of reductions currently committed/approved. By comparing the two views, the user can gain insight regarding the progress being made to meet the target levels at any point in time.

DETAILED DESCRIPTION

Figure 1:
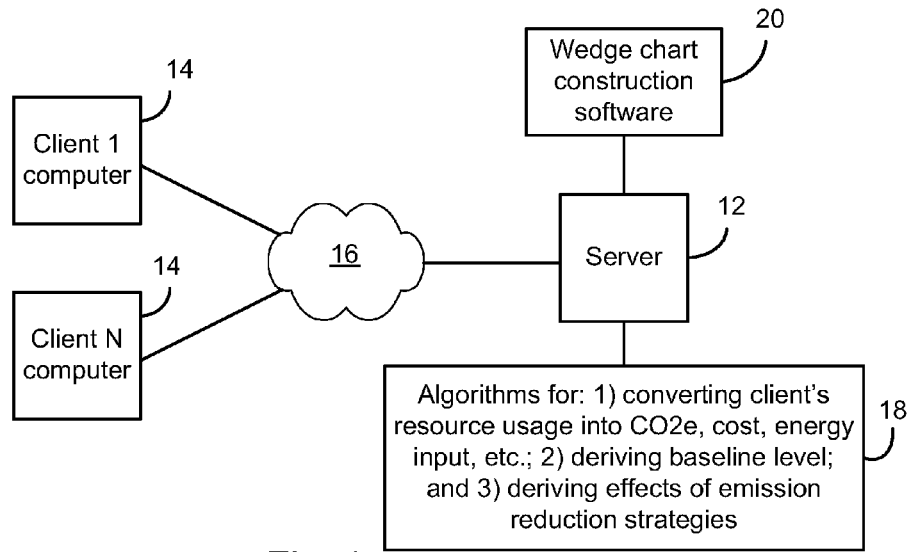
FIG. 1 schematically illustrates the centralized emission management system in accordance with one embodiment of the invention.

FIG. 1 illustrates the web-based emission management system. A server 12, which may be managed by the host, provides a website that interfaces with the various clients (organizations) to allow the clients to upload data to the server 12, view information generated by the server 12 relating to environmental impact, and allow the client to interact with the displayed information to develop emission reduction strategies. The server 12 and the clients' computers 14 communicate via the Internet 16. A client accesses its account using passwords or other methods.

Although the server 12 has many functions, and there may be a plurality of servers, only one server and its software routines related to the present invention are illustrated. The programs illustrated are algorithms 18 and the wedge chart construction software 20. The algorithms 18 include algorithms for converting the clients' entered resource usage and other information into CO2e emissions, cost, energy input, etc.; deriving a baseline level for future emissions; and deriving the effects of emission reduction strategies.

There may be thousands of clients using the system, and each can only view its own results.

The client may input available data into the system via the menu-driven website such as utility bill information identifying the quantity of energy used (e.g., kwh, gallons, etc.) and the types of energy used (e.g., gas, diesel, oil, electricity), the costs of such energy on the bill, airline travel, lighting usage, square footage of the facilities, types/amounts of products manufactured and types/amounts of emissions, efficiencies, waste products, locations, types of facilities (e.g., office, manufacturing, etc.), water usage, raw input product usage (e.g., paper, metals, etc.), cooling/heating facilities, costs of various pertinent resources, and many other types of data pertinent to the environment impact. The information would be initially entered by the client for each individual facility run by the client, although the system will be able to present processed information to the client on a per facility basis or aggregated for different regions or for the entire company.

Each input resource and/or output, assuming a certain usage efficiency, is applied to an appropriate algorithm to determine its corresponding CO2e emission quantity or other unit of measurement. Many of the algorithms 18 correlating resources, outputs, or activities to an equivalent CO2e emission are based on publicly known standards, such as the Emissions & Generation Resource Integrated Database (eGRID) conversion factors used by the Environmental Protection Agency.

The raw data is periodically input by the clients, such as at the end of each accounting period, which may be yearly. The client's data may also include information that is automatically uploaded to the server 12 through any interface, such as a utility meter for electricity, water, etc. All the past data is stored by the server 12.

The server 12 processes the data and presents the processed data to the client in a suitable presentation on the website, upon the client requesting the presentation. The present invention relates to the presentation of the processed data in the form of a wedge chart, an example of which is shown as the wedge chart 22 in FIG. 2.

The wedge chart 22 example displays CO2e emissions by a particular client over the span of years 2008-2018. The emissions prior to 2010 are based on actual usage, calculated from the raw data input by the client using accepted conversion factors (algorithms).

However, the real value in the wedge chart 22 is to provide a visual representation of various ways the client can reduce its emissions (or costs or input resources, etc.) in the future. Such an emission reduction may be mandated by the government or may be voluntary. A decision maker would find it extremely difficult to fully grasp the client's emission strategy simply by looking at numerical data.

The creation of the wedge chart 22 will be described with reference to the flowchart of FIG. 3, which identifies certain steps carried out by the server 12 in FIG. 1. The steps in FIG. 3 would be modified if the client wished the wedge chart to convey different information.

Figure 3:
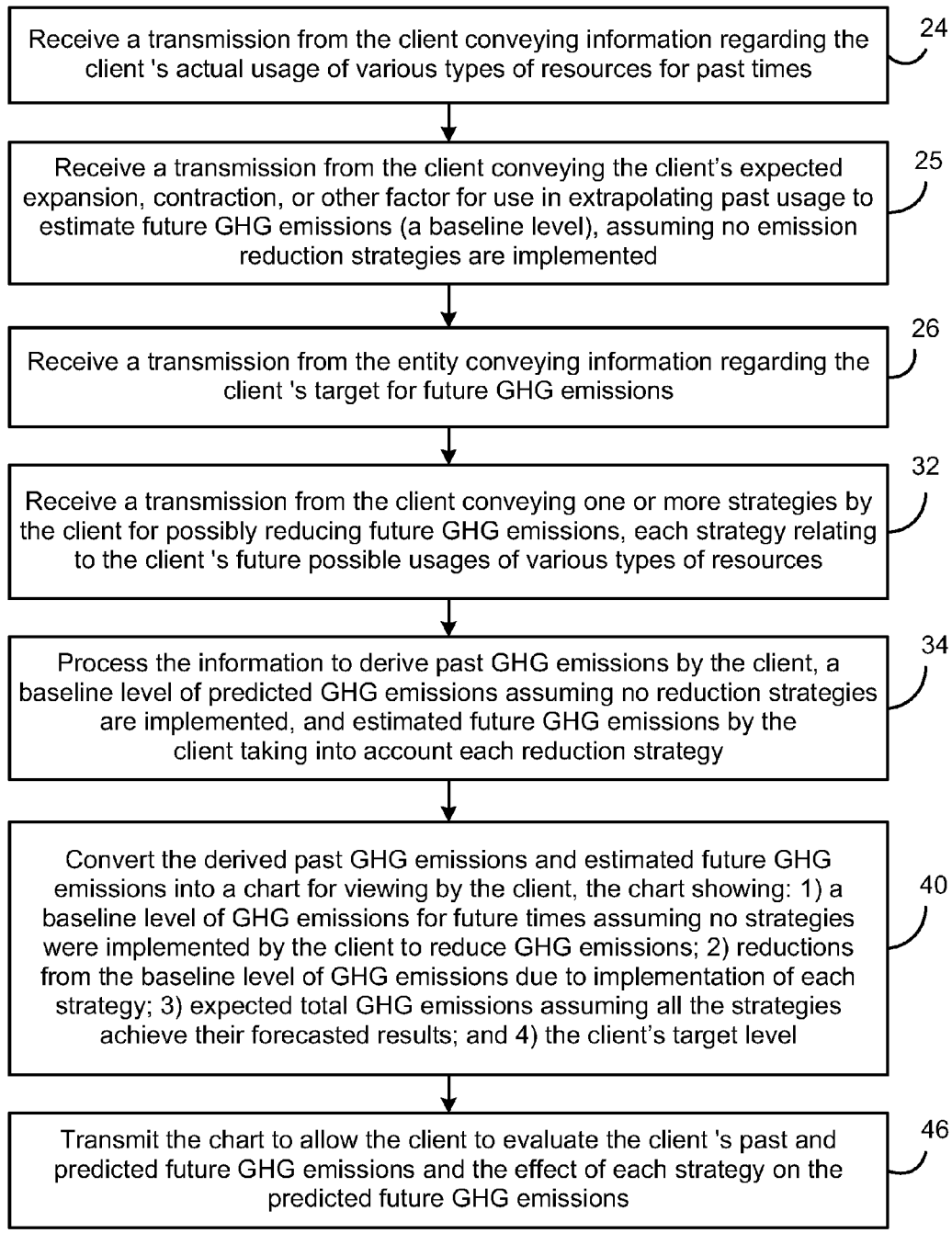
FIG. 3 is a flowchart of a method performed by the server of the centralized emission management system.

In step 24 of FIG. 3, the server 12 receives a transmission from the client, via the website, conveying information regarding the client's actual usage of various types of resources. This information is accumulated over time by the server 12.

In step 25, the server 12 receives a transmission from the client, via the website, conveying the client's expected expansion, contraction, or other factor for use in extrapolating past usage to estimate future GHG emissions (a baseline level), assuming no emission reduction strategies are implemented.

The organization will typically want to reduce emissions from the baseline level and will set an emission target level for each accounting period (e.g., year), as shown in step 26. In order to be able to compare the current or future estimated emission level (with or without reduction strategies) to this target level, this target level needs to be visualized alongside the current and future estimated emission levels. The same applies for the cap level that might have been set externally for this organization. Setting a cap level is optional. An ideal outcome for this organization is that the target and/or cap level slightly exceed the current and future estimated emission levels at any given point in time. Instead of using emissions as the units of measurements, the units of measurement may instead by the organization's resource input or output other than emissions.

In a similar way, the emission and emission reductions can also be defined monetarily. Every activity creating emissions, such as the consumption of electricity, comes at a specific cost. Every activity reducing emissions, such as the use of LEDs instead of bulbs, comes at a specific cost saving. An organization might choose to set a cost target level. The costs associated with each client's activity and reduction scenario are determined by a suitable conversion factor, or the costs are directly input by the client. By using the wedge chart, converted to costs, the organization can compare the predicted costs with the cost target levels.

Figure 2:
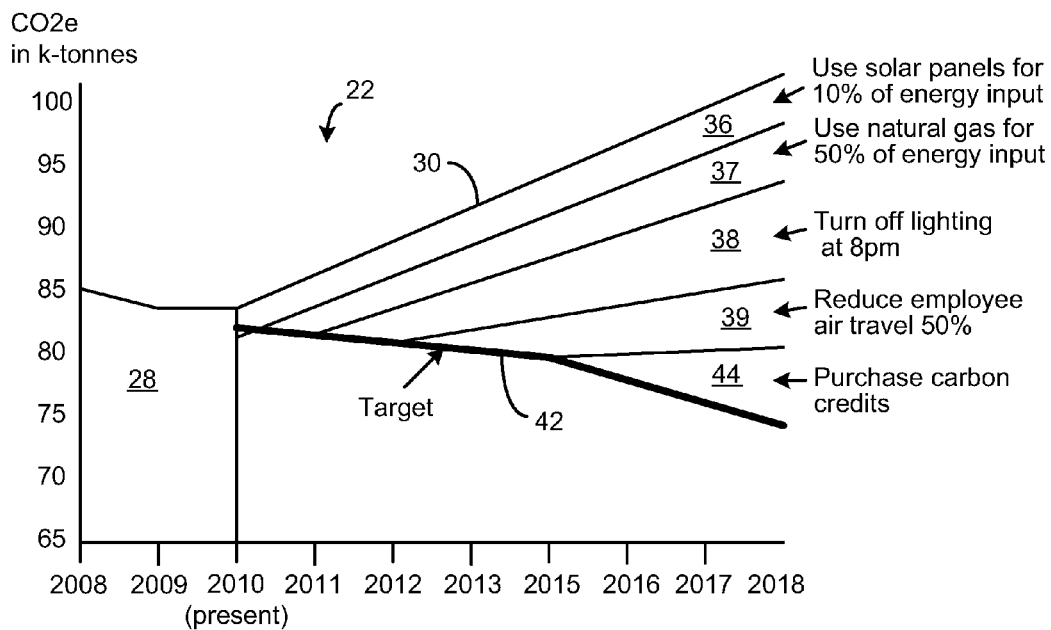
FIG. 2 is an example of the wedge chart conveying CO2e emissions over time based on data input by the user via a website.

In the example, the wedge chart 22 of FIG. 2 depicts CO2e emissions, rather than cost or input, and a different wedge chart can be viewed by the client by clicking an appropriate icon.

The first portion 28 of the wedge chart 22 depicts the CO2e emission, in kilo-tonnes, for past accounting periods based on actual usages.

The reduction strategies proposed by the client to reduce future emissions are shown deducted from the baseline level 30, where the baseline level 30 is the estimated future emission had no reduction strategies been implemented by the client. In the example of FIG. 2, the baseline level 30 is rising due to, for example, the client indicating that manufacturing is expected to rise 10% per year, personnel is expected to increase at 10% per year, the facilities area will increase 10% per year, etc. The baseline level 30 may also decline from the last accounting period or stay the same. The baseline level 30 is an extrapolation from actual usage.

The concept of forecasting and predicting future emissions is an important element of the wedge chart 22. While the actual emission totals are usually available for accounting periods in the past, the strategies involved with the reduction of these emissions typically deal with accounting periods in the present and future. The website allows the client to input any type of emission reduction strategy along with the starting time of the implementation of the strategy. Inputting reduction strategies is shown in step 32 of FIG. 3. The website may also provide the client with various emission reduction options that the client accepts and customizes for all or a portion of its facilities.

These strategies may include, for example, progressively reducing employee travel, replacing bulbs with LEDs, using more efficient windows, using green power sources, creating a recycling program, processing output gases, limiting costs for energy, etc.

The algorithms 18 in FIG. 1 are used by the server 12 to calculate the CO2e emission reductions over time due to each individual strategy. This is included in step 34 of FIG. 3. The factors used for deriving the CO2e emission normalization may be well known factors, and multiple factors may be used to, for example, convert the use of LEDs to a kwh reduction, then convert the reduction to an equivalent CO2e emission reduction.

In the example of FIG. 2, the client has input the strategies of: 1) the use of solar panels for producing 10% of the client's total energy usage, starting in 2010 (wedge 36); 2) the use of natural gas instead of oil for 50% of the client's total energy usage, starting in 2011 (wedge 37); 3) turning off certain lighting at 8 pm, starting in 2012 (wedge 38); and 4) reducing employee air travel by 50%, starting in 2015 (wedge 39). The wedge chart construction software 20 (FIG. 1) converts the processed data into the graphics shown in FIG. 2, identified by step 40 in FIG. 3. The strategies are listed based on the time of their proposed implementation.

The wedge chart 22 shows the target level 42 entered by the client and the proposed reduction strategies in an attempt to achieve the target level 42 up to the year 2018. The wedge chart 22 may be the product of many different iterations by the client adjusting the various strategies to meet the target level. Note in 2010, the target level 42 was briefly surpassed by the usage of solar panels (wedge 36). The target level 42 may be a cap imposed by the government, or a different cap level may be overlaid on the wedge chart 22.

In the example, the reductions are shown growing over time due to the client growing in size or increasing manufacturing.

The wedge chart construction software 20 (FIG. 1) allows the client to click on one of the wedges (strategies) to delete it, reduce it, or increase it, or replace it with another strategy, and the effect on achieving the target level 42 will be graphically shown. Increasing the size of the wedge, or time shifting a wedge, will also be processed by the server 12 to indicate to the client the required action needed to conserve the associated resources, such as to reduce employee travel by 75%.

In the event that the accumulated reduction strategies do not extend down to the target level 42 or cap level, the client may elect to purchase carbon credits (wedge 44) from another organization or client that has reduced its emissions below a cap level. The purchasing of carbon credits is a particular strategy that may be decided upon by weighing the various costs of additional reduction strategies. The server 12 may facilitate the transfer of credits and the financial transaction since it has knowledge of all clients' credits.

As new accounting periods pass, the client will be able to see how the actual emission reductions from implementation of a strategy compare to the previously predicted reductions. The client can therefore toggle the wedge chart between the estimated reductions from a strategy (earlier created) versus the actual reductions from the implemented strategy.

The wedge chart 22 was described using the example of GHG reductions, but also applies to the general field of emission reductions. This includes emissions in gaseous, solid, or liquid form that impact the atmosphere, water system, and/or ground.

Since all aspects of the wedge chart 22 can be converted to equivalent costs and cost reductions (cost savings) using stored factors, the client may click on an icon to convert the wedge chart to a cost wedge chart, with costs identified on the y-axis. The cost for implementing a strategy may be factored into a wedge as an amortized cost over time. For example, the baseline level 30 may be the client's cost for energy usage, and the wedge 36 may represent the predicted savings in energy cost using solar panels with the distributed cost of the solar panels factored in. The wedge chart information can also be converted into equivalent (normalized) input resources such as kwh, gallons of oil, etc. In such a case, wedge 36 may represent the reduction in kwh by using solar panels.

Figure 4:
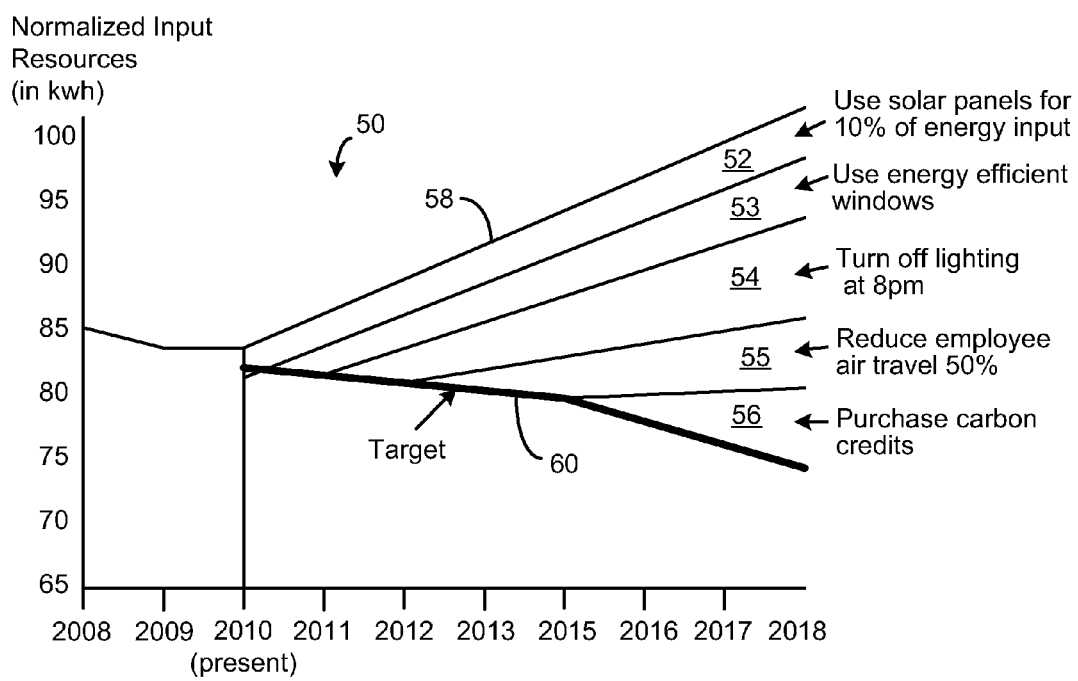
FIG. 4 is an example of the wedge chart conveying the client's input resource usage over time based on data input by the user via a website.

FIG. 4 illustrates a wedge chart 50 that normalizes the client's activities in terms of input resource usage, specifically in units of kwh. Examples of various reduction strategies 52-55, and the purchase of carbon credits 56, are identified in the wedge chart 50, and the effects of each strategy in comparison to the extrapolated baseline level 58 and target level 60 are shown. The shape of the wedge chart 50 would not necessarily track that of the CO2e wedge chart 22 for the same strategies. The wedge chart 50 can also be converted into costs by the server 12, since each kwh has a cost associated with it, and the costs for implementing each strategy can be factored in.

The client can set any time periods for the x-axis. A default wedge chart can be initially created for the client, proposing various reduction strategies, for the client to then modify.

The flowchart of FIG. 3 shows as step 46 the transmission of the resulting wedge chart 22, such as to a system for displaying the wedge chart on a website via the Internet, so that the client can evaluate the wedge chart.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for evaluating greenhouse gas (GHG) emissions by an entity comprising:
   a. receiving a transmission from the entity conveying the entity's usage of resources for past times;
   b. receiving another transmission from the entity conveying one or more strategies proposed by the entity for reducing future GHG emissions, each strategy having a start time and each strategy relating to the entity's expected usage of the resources for future times;
   c. deriving, using a programmed processing system, past GHG emissions by the entity from information received in step a, a baseline level of future GHG emissions by the entity from the past GHG emissions assuming no strategies for reducing future GHG emissions are implemented, and estimated future GHG emissions by the entity for implementing each of the one or more strategies from information received in step b;
   d. converting, using the programmed processing system, the past GHG emissions, the baseline level of future GHG emissions, and the estimated future GHG emissions into a chart for viewing by the entity, the chart comprising:
      a horizontal axis indicating past times and future times;
      a vertical axis indicating amounts of GHG emissions;
      a first portion bounded by the horizontal axis and the vertical axis identifying the past GHG emissions along the horizontal axis; and
      a second portion bounded by the horizontal axis and the vertical axis identifying the estimated future GHG emissions along the horizontal axis, the second portion indicating:
         the baseline level of future GHG emissions;
         reductions of the baseline level of future GHG emissions due to implementation of each strategy identified in step b, wherein the one or more strategies are presented as lines of future GHG emissions below the baseline level of future GHG emissions in an order based on their start times, a first line is a first reduction of future GHG emissions from the baseline level of future GHG emissions, and each subsequent line is a subsequent reduction of future GHG emissions from the preceding line; and
   e. transmitting the chart to allow evaluation of the effect of each strategy on the estimated future GHG emissions.

2. The method of claim 1 further comprising receiving an additional transmission from the entity conveying a target level for future GHG emissions, wherein the second portion of the chart further identifies the target level of future GHG emissions along the horizontal axis for the entity to determine differences between the estimated future GHG emissions and the target level of future GHG emissions.

3. The method of claim 1 further comprising:
   receiving one or more additional transmissions by the entity revising the one or more strategies;
   revising the second portion of the chart to show the effects on the estimated future GHG emissions resulting from each revised strategy; and
   transmitting the chart including the revised second portion to allow evaluation of the effect of each revised strategy on the estimated future GHG emissions.

4. The method of claim 1 wherein the second portion also identifies GHG emission credits needed to meet the target level of future GHG emissions.

5. The method of claim 1 wherein the first portion and the second portion of the chart are continuous along the horizontal axis.

6. The method of claim 1 wherein each separate layer identifies a different strategy is a different color.

7. The method of claim 1 wherein step a comprises receiving the transmission from the entity via a computer network, wherein step b comprises receiving the other transmission from the entity via the computer network, wherein steps c and d are performed by a remote server, and wherein step e comprises serving the chart from a website for viewing by the entity.

8. The method of claim 1 wherein the vertical axis indicating amounts of GHG emissions indicates masses of carbon-dioxide emitted by the entity.

9. The method of claim 1 further comprising:
   receiving an additional transmission from the entity conveying expected changes in the entity's expected usage of the resources for future times, not including any strategies for reducing GHG emissions;
   wherein step c further comprises processing the expected changes to derive the baseline level of future GHG emissions.

10. The method of claim 9 wherein the expected changes in the entity's expected usage of the resources for future times comprise any one of changes in personnel employed by the entity, changes in area of facilities operated by the entity, or changes in usage due to a change in output by the entity.

11. The method of claim 1 wherein step a further comprises receiving an additional transmission from the entity conveying the entity's output for past times.

12. The method of claim 11 wherein the output comprises emissions by the entity.

13. A method for evaluating resource usage by an entity comprising:
   a. receiving a transmission from the entity conveying the entity's usage of resources for past times;
   b. receiving another transmission from the entity conveying one or more strategies proposed by the entity for reducing future usage of the resources, each strategy having a start time and each strategy relating to the entity's expected usage of the resources for future times;
   c. deriving, using a programmed processing system, past usage of the resources by the entity using a first unit of measurement from information received in step a, a baseline level of future usage of the resources by the entity using the first unit of measurement from the past usage of the resources assuming no strategies for reducing future usage of the resources are implemented, and estimated future usage of the resources by the entity using the first unit of measurement for implementing each of the one or more strategies from information received in step b;

d. converting, using the programmed processing system, the past usage of the resources, the baseline level of future usage of the resources, and the estimated future usage of the resources into a chart for viewing by the entity, the chart comprising:

a horizontal axis indicating past times and future times;

a vertical axis indicating amounts of the resources in the first unit of measurement;

a first portion bounded by the horizontal axis and the vertical axis identifying total usage of the resources along the horizontal axis; and a second portion bounded by the horizontal axis and the vertical axis identifying the estimated future usage of the resources along the horizontal axis, the second portion indicating:

the baseline level of future usage of the resources;

reductions of the baseline level of future usage of the resources due to implementation of each strategy identified in step b, wherein the one or more strategies are presented as lines of future usage of the resources below the baseline level of future usage of the resources in an order based on their start times, a first line is a first reduction of future usage of the resources from the baseline level of future usage of the resources, and each subsequent line after the first line is a subsequent reduction of future usage of the resources from the preceding line; and e. transmitting the chart to allow evaluation of the effect of each strategy on the estimated future usage of the resources.

14. The method of claim 13 further comprising receiving an additional transmission from the entity conveying a target level of future usage of the resources, wherein the second portion of the chart further identifies the target level of future usage of the resources along the horizontal axis for the entity to determine differences between the estimated future usage of the resources and the target level of future usage of the resources.

15. The method of claim 13 further comprising:

receiving one or more additional transmissions by the entity revising the one or more strategies;

revising the second portion of the chart to show the effects on the estimated future usage of the resources resulting from each revised strategy; and transmitting the chart including the revised second portion to allow evaluation of the effect of each revised strategy on the estimated future usage of the resources.

16. The method of claim 13 wherein the first portion and the second portion of the chart are continuous along the horizontal axis.

17. The method of claim 13 wherein the first unit of measurement is kilowatt-hours.

18. The method of claim 13 further comprising:

receiving an additional transmission from the entity conveying expected changes in the entity's expected usage of the resources for future times, not including any strategies for reducing usage of the resources;

wherein step c further comprises processing the expected changes in the entity's expected usage of the resources for future times to derive the baseline level of future usage of the resources.

19. The method of claim 18 wherein the expected changes in the entity's expected usage of the resources for future times comprise any one of changes in personnel employed by the entity, changes in area of facilities operated by the entity, or changes in usage due to a change in output by the entity.

20. The method of claim 13 further comprising the programmed processing system converting the first unit of measurement into an equivalent cost, and generating another chart showing sage of the resources in terms of cost.

* * * * *